(12) United States Patent
Goldshtein et al.

(10) Patent No.: US 10,835,836 B2
(45) Date of Patent: Nov. 17, 2020

(54) METHOD AND SYSTEM OF COMBINED POWER PLANT FOR WASTE HEAT CONVERSION TO ELECTRICAL ENERGY, HEATING AND COOLING

(71) Applicants: Lev Goldshtein, Pardes Hanna (IL); Eli Ganoz Margolin, Peta Tikva (IL); Yakov Elgart, Melbourne (AU); Moti Goldshtein, Pardes Hanna (IL)

(72) Inventors: Lev Goldshtein, Pardes Hanna (IL); Eli Ganoz Margolin, Peta Tikva (IL); Yakov Elgart, Melbourne (AU); Moti Goldshtein, Pardes Hanna (IL)

( * ) Notice: Subject to any disclaimer, the term of this patent is extended or adjusted under 35 U.S.C. 154(b) by 201 days.

(21) Appl. No.: 15/778,653

(22) PCT Filed: Nov. 24, 2016

(86) PCT No.: PCT/IL2016/051269
§ 371 (c)(1),
(2) Date: May 24, 2018

(87) PCT Pub. No.: WO2017/090046
PCT Pub. Date: Jun. 1, 2017

(65) Prior Publication Data
US 2018/0353873 A1 Dec. 13, 2018

Related U.S. Application Data

(60) Provisional application No. 62/259,312, filed on Nov. 24, 2015.

(51) Int. Cl.
*F01K 25/10* (2006.01)
*B01D 1/00* (2006.01)
(Continued)

(52) U.S. Cl.
CPC ............. *B01D 1/0058* (2013.01); *B01D 1/14* (2013.01); *C02F 1/16* (2013.01); *C09K 5/045* (2013.01);
(Continued)

(58) Field of Classification Search
CPC ........ B01D 1/0058; B01D 1/14; C09K 5/045; F01K 25/10; F01K 23/10; F01K 9/003; C02F 1/16
See application file for complete search history.

(56) References Cited

U.S. PATENT DOCUMENTS 3,139,069 A 6/1964 Zenz
3,769,942 A 11/1973 Brehler
(Continued)

FOREIGN PATENT DOCUMENTS

WO 2004/077586 9/2004

*Primary Examiner* — Michael C Zarroli

(57) ABSTRACT

The present invention pertains to a combined power plant, which produces electrical energy, heating, and cooling from waste and other sources of heat. The plant comprises two independent systems: direct (Rankine) and inverse Carnot (refrigeration) cycles. Both systems feed from the same heat sources with temperature from 60° C. to 550° C., with coefficient of conversion of heat to electricity around 40%. Evaporator (i) of reverse cycle is placed inside condenser (c) of the direct cycle to enable to reach low temperature of condensation—up to −35° C. In this case, the condensation temperature is pre-programmed with corresponding pressure, and is independent of ambient temperature. The plant uses highly efficient impact—foam heat exchangers with a pulse inflow method of refrigerant control (condenser C), and instead of the traditional hermetic refrigeration compressor, uses pressure amplifiers (d, k) and jet-flow compressor (f).

39 Claims, 9 Drawing Sheets

(51) Int. Cl.
  *B01D 1/14* (2006.01)
  *C02F 1/16* (2006.01)
  *F01K 9/00* (2006.01)
  *F01K 23/10* (2006.01)
  *C09K 5/04* (2006.01)

(52) U.S. Cl.
  CPC .............. *F01K 9/003* (2013.01); *F01K 23/10* (2013.01); *F01K 25/10* (2013.01)

(56) References Cited

U.S. PATENT DOCUMENTS

| | | | |
|---|---|---|---|
| 3,908,602 A | 9/1975 | Brulfert | |
| 4,009,575 A | 3/1977 | Hartman, Jr. et al. | |
| 4,803,958 A | 2/1989 | Erickson | |
| 7,100,380 B2 * | 9/2006 | Brasz | C09K 5/045 62/114 |
| 7,493,763 B2 * | 2/2009 | Klochko | F01K 25/08 60/641.7 |
| 8,188,198 B2 * | 5/2012 | Van Der Schrick | C08F 10/00 422/138 |
| 9,222,372 B2 * | 12/2015 | Benson | F01K 25/10 |
| 9,243,520 B2 * | 1/2016 | Oxner | F01K 25/10 |
| 9,500,185 B2 * | 11/2016 | Al-Sulaiman | F01K 23/02 |
| 9,816,401 B2 * | 11/2017 | Noureldin | F01K 23/04 |
| 9,903,232 B2 * | 2/2018 | Amir | F25J 3/0214 |
| 2008/0168772 A1 * | 7/2008 | Radcliff | F01K 23/04 60/651 |
| 2010/0280135 A1 * | 11/2010 | Doty | C01B 3/02 518/703 |
| 2012/0023940 A1 * | 2/2012 | Kitz | F01K 9/00 60/641.2 |
| 2013/0104546 A1 * | 5/2013 | Goswami | F03G 6/00 60/641.8 |

* cited by examiner

METHOD AND SYSTEM OF COMBINED POWER PLANT FOR WASTE HEAT CONVERSION TO ELECTRICAL ENERGY, HEATING AND COOLING

TECHNICAL FIELD

The present invention pertains to combined power plants. More particularly, the present invention pertains to power plants that combine Rankine and reverse refrigerating cycles that simultaneously work together based on waste, marginal, redundant and other heat sources.

BACKGROUND

Enormous amounts of waste heat spilled, flows and fumes into ambient environment, contaminates our living surroundings, creating greenhouse effect. The said waste heat is expelled mostly at temperatures of 60 to 550 Celsius degrees. About 40% to 70% of the heat produced by burning of organic fuels is lost as a waste heat. Numerous attempts were made to improve the situation. Most known is Organic Rankine Cycle (ORC), in which low temperature waste heat converts into vapor of low temperature working medium, in which said vapor actuates turbine which drives an electrical generator. The worst problem of ORC is its low heat to electricity conversion efficiency factor, which may reach a maximum of 10%. Another example is the Kalina system. The said process has greater efficiency and works at low geothermal temperatures, but suffers from severe problem of corrosion, which leads to often frequent shutdowns of the system for repairs and parts substitution.

Different types of systems for waste heat conversion to electricity have been proposed in the art, some of which are listed below in the following patent publications:

"Waste Heat Organic Rankine Cycle+ ORC: U.S. Pat. Nos. 4,386,499; 4,590,384; 4,617,808; 4,760,705; 4,901,531; 5,038,567; 5,056,315; 5,119,635; 5,339,632; 5,598,706; 5,632,143; 5,640,842; 5,664,419; 5,761,021; 5,809,782; 5,860,272; 6,009,711; 6,101,813; 6,497,090; 6,526,754; 6,539,718; 6,539,720; 6,539,723; 6,571,548; US 2002/8148225; US 2003/0029169; US 2003/008110; US 2003/0167769; US 2003/0218385; US 2004/0088993; US 2004/0255587; U.S. Pat. Nos. 7,665,304; 8,240,149.

Kalina Cycle: U.S. Pat. Nos. 4,346,561; 4,489,563; 4,548,043; 4,586,340; 4,604,867; 4,732,005; 4,763,480; 4,899,545; 4,982,568; 5,029,444; 5,095,708; 5,440,882; 5,450,821; 5,572,871; 5,588,298; 5,649,426; 5,822,990; 5,950,443; 5,953,918.

According to the patent search, all known closed cycles as direct (Rankine) and reversed (refrigerating) were analyzed and displayed the following drawbacks, particularly in comparison with the device of the present invention:

Basic drawback of all systems using the closed vapor cycles for heat conversion into electrical energy is a usage of ambient cooling medium that results in the following disadvantages:

water, which ambient temperature can reach +32° C. and more;

air, which ambient temperature can reach +42° and more.

Because temperature of vapor condensing process depends on ambient temperature, it is impossible to achieve a maximum effectiveness of the system, i.e. to use maximum energetic potential of the devices.

The problem is that at changing of ambient condensing temperature the system works in different regimes and effectiveness of system decreases—as a result the COP (ratio of effectively used heat to introduced input heat) of the system decreases and amount of provided electrical energy decreases too.

Technical solutions for direct cycle combined system are absent: jet flow compressor in reverse cycle for providing of pre-defined (pre-established) condensing temperature of working (body) gas and possibility of maximal usage of waste heat. The effective heat receivers—vapor generators with low temperature boiling working bodies, are also absent.

An additional problem is the absence of condensers, which include elements of direct and reverse cycles (condenser) and are able to operate with low boiling working medium.

A further problem is the absence of maintaining constant condensing temperature and pressure, independent on loading change.

Another issue is the use of hermetic gas pumps for operation with high pressure organic vapor. These pumps have complex sealing design; that increases pump cost significantly, complicates operation, and decreases life time. The hermetic pumps require additional electric power, which may be as much as 10% of produced one. Such systems have large dimensions, complicated in assembly, and do not allow full-ready factory assembly for add-on installation. Further, the used systems create high level noise, higher than 80 Db. Generally used systems are bulky and cumbersome, seize big areas and have huge weight. Manufacturing of the existing systems is expensive and time-consuming. As a rule, the existing systems are impossible to use as add-ons for waste heat utilization for additional electrical power production.

Analysis of existing patents and papers shows that the above listed drawbacks are not overcome. The closest patents to the proposed invention are Kalina Cycle patents: U.S. Pat. Nos. 4,346,561 and 4,489,563. Kalina Cycle comprises classical absorbing thermal system, in which the turbine with electrical generator uses waste heat (basically geothermal).

Basic drawbacks of the Kalina system are:

Turbine efficiency depends strongly on ambient temperature, whereby Kalina's process extracts a heat from the working steam.

As a working body water-ammonia solution is used. This working body is not ecology friendly, strongly corrosive and harmful for maintenance personnel.

Absorbing machines (which are used in Kalina cycle) have large dimensions, are heavy, not mobile, and so cannot be used as add-on systems for existing power plants.

The system is difficult and complicated for employing control systems.

The system has high wear.

The system requires hermetic pumps, which are extra consumers of produced electricity by main or add-on turbines. This consumption can reach up to 10% of produced electrical energy. Kalina system requires a large capital investment to put into operation. Refunding period for Kalina system is about 7-10 years.

In view of the above, a new approach is required in this field, which will offer high efficient waste heat to electricity conversion, combined with high reliability and service life longevity, with good cost to electricity output relation.

It is, therefore, an object of the present invention to overcome the principal deficiencies of the Kalina system.

In particular, it is yet another object of the present invention to provide a system that provides significant efficiency advantage over the Kalina system.

This and other objects and embodiments of the invention shall become apparent as the description proceeds.

SUMMARY OF THE INVENTION

In one aspect, the invention relates to combined power plants which include direct cycle (Organic Rankine) and inverse (refrigerating) cycle for producing electrical energy from waste heat. In one particular embodiment, the devices of the present invention employ heat expelled for instance by exhaust gas of turbines or other thermal sources with temperature above 60° C. This heat can be utilized by add-on device to existing power plants or as stand-alone electricity (or any other kind of energy) plant for energy production.

For instance, the proposed device (system) of the present invention intakes exhaust gases from a main turbine and converts this waste heat to electrical energy with efficiency up to 40%, converting up to 80% of total amount of waste heat flow.

In another aspect, the present invention relates to combined power plants, including direct Rankine and reverse refrigerating cycles, working together simultaneously from sources of waste or other heat, of temperature from 60° C. to 550° C. and higher, for production of electrical, heating and cooling energy with power of from 5 kW to 12 MW and higher. Such combination of power plants can be applied as standalone adding module or independent power working for instance from gas turbines, diesel motors with efficiency up to 40% for producing electrical energy with usage of waste heat.

In one particular embodiment, the system of the present invention comprises the following sub-systems and elements:

direct (Organic Rankine) cycle—configured for electricity production; and inverse cycle (refrigerating) that is configured to work also with light boiling working medium, where the direct and inverse cycles are in thermal communication with each other.

In still another particular embodiment, the system of the present invention further comprises:

pulse device configured for constant keeping of the system working regime at predefined temperature level; and jet-flow compressor.

In particular, the jet-flow compressor is configured to avoid application of expansive piston or centrifugal compressor.

In a particular example, the ORC (Organic Rankine Cycle) comprises the following components (see also FIG. 1 and its corresponding description):

a closed contour thermodynamic cycle that uses light boiling work medium, for instance R134a or R245fa or other;

a turbine with electrical generator (exemplified as (b) in FIG. 1);

a built-in into waste gases exhaust channel special vapor generator (exemplified as (a) in FIG. 1) in which it receives heat by means of heat exchanger which uses liquid-bubbling process; and a condenser with increased effectiveness (exemplified as (c) in FIG. 1), in which heat transfer, condensation and farther cooling are performed by means of introducing the cooling heat exchanger (exemplified as (i) in FIG. 1) into it from the reverse (refrigerating) cycle. This enables exclusion of ambient cooling medium (like ambient air or water) for condensation purpose. This condenser is configured to significantly reduce predetermined condensing temperature of working medium. This way it lowers cycle bottom temperature and increases amount of delivered electricity from the same waste heat. Pressure amplifier (exemplified as (b) in FIG. 1) instead of hermetic pump is used, simplifying the system significantly and reducing system self-consumed energy and system cost.

In one particular embodiment, the inverse cycle (refrigerating) works also with light boiling working medium, for instance gas R134a or R245fa or other.

In still another particular embodiment, the inverse cycle comprises (see FIG. 1):

vapor generator (exemplified as (e) in FIG. 1);
jet-flow compressor (exemplified as (f) in FIG. 1);
condenser (exemplified as (g) in FIG. 1); and
pressure amplifier (exemplified as (k) in FIG. 1).

In particular, the pulse devices of the system are designated for constantly keeping the system working regime at a predefined temperature level.

In one particular embodiment, jet-flow compressor (exemplified as (f) in FIG. 1) is configured to avoid application of expansive piston or centrifugal compressor, usually applied for liquid gas streaming into vapor generator.

Due to its effectiveness, simplicity and compactness, the system is configured to be used as add-on compact system, highly mobile, factory ready for use. It makes possible to integrate the system of the present invention into existing energy plants without any rebuilding or reconstruction of plant. Accordingly, the system may be directly used in any transport energy producing units, like diesels in ships or big locomotives. For example, use of the proposed system enables to increase travel distance of a ship or to save diesels or turbines consumed fuel.

In one particular embodiment, the system is configured be used also by any manufacturer having their own energy plants. Particularly, the system is also configured to use waste heat and produce electrical energy from 5 kW to 12 MW and more. Further, the system of the present invention is configured to work as CHP (Combined Heat and Power) energy plant and additionally electrically produce refrigerating and heating energy. In this type of use the system is configured to reach efficiency of 80% and above.

As mentioned above, in one embodiment, the application field of the system is in a temperature range from 60° C. to 550° C. and higher of input heat. The system of the present invention is distinguished by lower production and service cost than standard ORC systems. This added value is achieved by excluding high cost hermetic centrifugal pumps, significant increase of heat transfer effectiveness and therefore significant reduction of heat exchangers volume and sharp reduction of service costs. Refunding period of proposed add-on system equals to about 3 years of use, continuous use of around a year, and electricity cost is about 0.1 to 0.15 $ for 1 kWh. The noise produced by the system reduces significantly by use of special novel devices as detailed above and further in the description and drawings. The system is designed as module, which is configured to be simply built-into existing power units without significant modifications of the latter.

In one particular embodiment, the objectives of the system of the present invention are as follows:

Increasing electrical power output from the same amount of waste heat independent on environment temperature.

Increasing COP coefficient (ratio of effectively used heat to introduced input heat) not less than 0.8 and more.

Increasing produced output electricity up to 40% of inputted heat energy.

Excluding environmental conditions influence (for instance surrounding air or water) on efficiency of electrical power generation by introduction of closed contour refrigerating process into condenser with light boiling working medium.

Keeping constant condensing temperature and pressure of working medium. These parameters do not depend on environment conditions and output loading of the proposed system.

Excluding hermetic pump, which is generally used for increasing working medium pressure after condensing up to the required pressure for returning working medium in liquid phase back to the vapor generator.

Increasing the efficiency of the system by use of novel jet-flow compressor.

In one particular embodiment, the system of the present invention is configured to utilize its advantages by reducing its size, particularly relative to its power production capabilities, and accordingly permit easy integration with existing power systems.

To summarize, the objectives listed above are achieved by the following characteristics of the system of the present invention:

The system of the present invention essentially comprises two thermal closed contours combined together: direct Organic Rankin Cycle and reverse refrigerating contours. Created hot gases in vapor generator of ORC direct contour heat absorber (a in FIG. 1) actuates turbine (b in FIG. 1) with electrical generator. The second refrigerating contour helps lowering the condensation temperature of the working medium in the first contour condenser (c in FIG. 1) (up to minus 35° C. and less), thus significantly increasing efficiency of the entire device (up to 40% and higher of electricity energy output). This action is performed by hot gases created in reverse contour heat absorber (vapor generator e in FIG. 1), flowing into jet-flow compressor (f in FIG. 1), sucking action by jet-flow compressor from inner condenser (c in FIG. 1), vapor generator (i in FIG. 1) thereby lowering pressure of the gas and its temperature in the condenser (c). During this process the turbine (b) outlet gases are condensed and cooled. Further liquefied gas pressure increased in pressure amplifier (d in FIG. 1) by equating inner vessel pressure to that in the evaporator's (a in FIG. 1) pressure and leveling liquids levels in both vessels (a in FIG. 1) and (d in FIG. 1) in such way that the law of communicating vessels is kept.

In this invention new heat transfer process is applied, which is thermal impact-foam heat transfer process. The detailed process is depicted in further disclosure in the following description with reference to the accompanying Figures. Said process significantly improves heat transfer from gaseous media to wall, thus reducing required heat transfer surfaces and reducing energy conversion system size. Automation by pulse regulating of predetermined temperatures in both cycles is also a new sub-system, which enables to constantly keep thermal working regime, independently from ambient temperature conditions.

For further effective use of waste heat, exchangers between turbine (b in FIG. 1) and jet-flow compressors (f in FIG. 1) are inserted (not shown in FIG. 1). Heat exchangers have cylindrical or other curved surfaces, and are made from high thermal conductive materials and built-in coil-pipe (classical scheme).

The following exemplifies further aspects and embodiments of the present invention without departing from the broadest scope of the present invention.

DETAILED DESCRIPTION OF THE DRAWINGS

Figure 1:
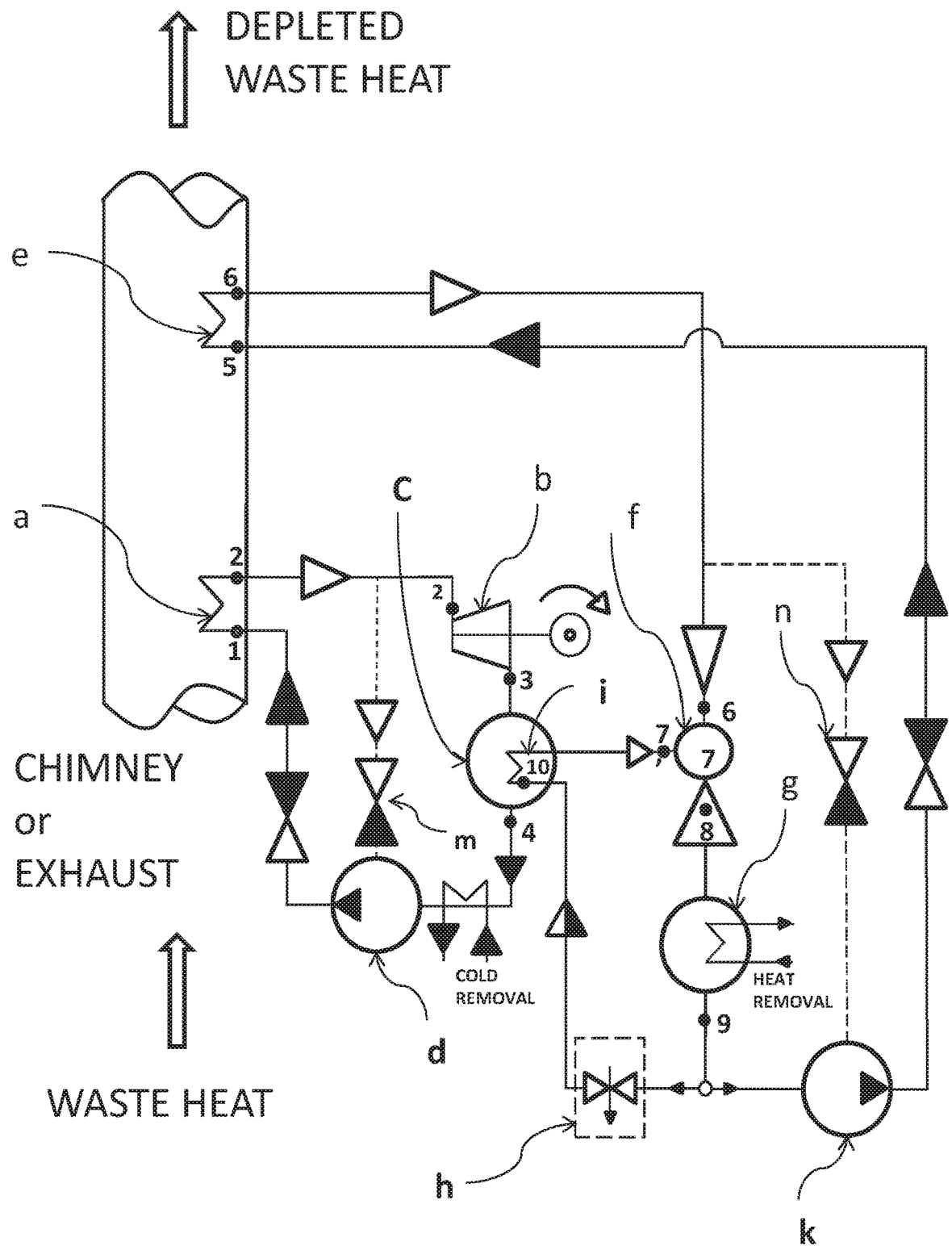
FIG. 1 is a basic scheme of combined system of the present invention for conversion of waste heat to electrical/mechanical, cold and heat energy.

FIG. 1 schematically illustrates a combined system for conversion of heat energy into electrical (and/or thermal, such as heat pump) energy that includes the following sub-systems:

Direct cycle—Input waste heat vapor generator (a), or as alternative, for one contour system, evaporator with super heater (a'); turbine (b) with electrical generator; condenser (c), pressure amplifier (d), and non-return valves (m).

Reverse refrigerating cycle—Input waste heat evaporator (e); jet-flow compressor (f), pulsing sub-system (h) for working medium delivery into heat exchanger (i) of main condenser (c); non-return valve (n); refrigerating condenser (g); refrigerating pressure amplifier (k).

The use of reverse cycle enables to exclude the cooling by environmental cooling media (e.g., water, air) and maintain cooling temperature on a constant preprogrammed level, independent of ambient conditions; to maintain this temperature on a most efficient level for receiving the biggest amount of converted energy from a waste (or from any other source) heat.

The use of pressure amplifier (d) enables to exclude the special hermetic pump for forcing flow of working medium into input evaporator. The said pressure amplifier can be preprogrammed to operation regime for a working medium delivery into evaporator.

The jet-flow compressor may be done as a one-, two- or three-staged device, depending on input waste heat gas flow parameters—temperature and pressure and required condensing conditions. For instance, for waste heat temperature of 300° C., usage of two to three stage jet-flow compressors (i) is possible, for achieving the condensing temperature of −30° C.

Figure 2:
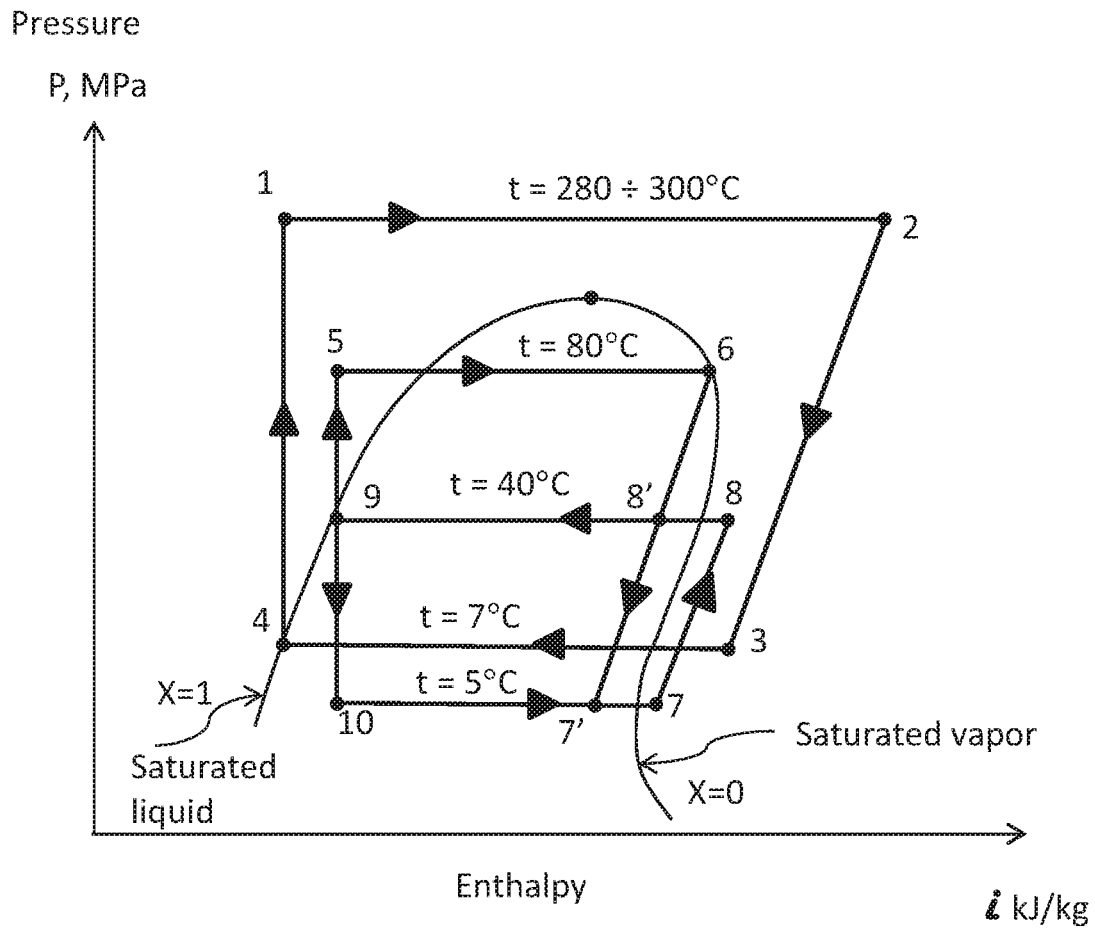
FIG. 2 is the enthalpy-pressure diagram of the system.

FIG. 2 displays theoretical enthalpy-pressure diagram (p-i) of the proposed combined cycle for conversion of waste heat to electrical (or/and any other kind of output) energy. The following describes the combined cycle work description with reference to FIG. 2:

The working medium in a liquid phase inflows into main vapor generator, (point 1 in the graph and see also point 1 in Table 1 further in the description). The table is arranged for heat source of temperature of 300° C. and condensate temperature of 7° C. Further, the gas is heated and boiled and in gaseous phase leaves vapor generator at high pressure and speed, flowing into turbine (b), parallel to point 2 on the graph. Worked out gas leaves turbine (b) and enters condenser (c, see FIG. 4), parallel to point 3 on the graph (FIG. 2) and Table 1). Condensing pressure $P_c$ is adjusted so as to provide maximum energy extraction from waste heat (in this case, maximum electrical energy is generated). Here gas temperature lowers to the value of 7° C. on behalf of cooling process which occurs in inner vapor generator (i), from which continuously sucked gas of second refrigerating contour occurs by means of jet-flow compressor (f). Refrigerating thermodynamic contour receives hot gas from secondary vapor generator (e), where working medium in liquid phase (point 5 on the graph and Table 1) heated, boiled and converts to gaseous phase, farther streamed (point 6 on graph and Table 1) to jet flow compressor (f), see FIG. 5, having narrowed section (f-3), which creates reduced sucking pressure in it. This reduced pressure forcing gas into inner heat exchanger (i) is directed to flow from vapor generator toward jet-flow compressor (f), (point 7 on graph in FIG. 2 and Table 1). Thus such created low pressure in vapor generator (i) creates temperature reduction and induces condensing of working medium in condenser (c). Further gas of secondary refrigerating contour flows to condenser (g), (point 8 on graph and Table 1) where liquefying of gas occurs, and further gas flows into secondary pressure amplifier (k), (point 9 on Graph and Table 1). Then gas flows back into secondary vapor generator (e) via non return valve, (point 9 on graph and Table 1). Separately, the same gas flows via throttle (h) into vapor generator (i), point 10 on graph and Table 1). Further, in both pressure amplifiers as in primary (d) and secondary (k), pulsating gas inflow circuits exist. These circuits perform constant pressure control in both pressure amplifiers, by means of sequentially closing and opening of solenoid valves, regulated by pressure measuring sensors and actuators. Such regulation process performs keeping constant level of liquid gas in both pressure amplifiers. Full description of pressure amplifiers is detailed farther in the specification.

In the refrigerating cycle in the combined cycles system of the present invention, pulsed injection method of working medium streaming is applied; it is carried out by devices (h, i, f) designed as a single unit or as a group of devices. The pulse injection is working as follows: Device (h) opens and closes periodically according to commands from controller, which receives input data from pressure sensor located inside the condenser vessel. As pressure drops below preset bottom value, the controller opens valve (h), and liquid gas flows into vapor generator (i). When pressure increases above preset upper value, the controller closes valve (h) and flow of liquid working medium into heat exchanger stops. Thus constant value of condensing rate is kept. The frequency between opening and closing of valve (h) directly depends on power loading of the combined cycle system; when load is low, time period between opening and closing is longer than in the case of full load of the system. In case of full load of the system, the frequency is higher.

The applied pulse injection method has the following advantages:

Pulse supply reduces losses in a comparison with regular throttling process usually applied in all throttling systems (in all expander machines) significantly;

Providing independence on a heat load; the evaporating temperature is constant:

While heat load increases pulses frequency also increases;
While heat load decreases, pulses frequency decreases.
Thus, required work in refrigerating cycle decreases:

$$L_w = L_{w'} - \Delta L_w; \quad (1)$$

Where: $L_w$ is net work in refrigerating cycle; $L_{w'}$—theoretical refrigerating work; $\Delta L_w$—work losses on throttling process.

Increases cooling output in refrigerating cycle:

$$Q_o = Q' + \Delta Q_o; \quad (2)$$

Where: $Q_o$—resulted cooling energy; $Q'$—cooling energy without throttling losses; $\Delta Q_o$—cooling energy required for throttling process.

The advantages pointed above are especially important at low thermal loads.

The operating process as shown in P-I diagram comprises the following advantages:

Losses in a comparison with regular throttling process usually applied in all throttling systems (in all expander machines) are reduced significantly;

The evaporating temperature is kept constant and it does not depend on a heat load:

Heat flux via the same heat exchanging surface increases.

According to the P-I diagram the working process is carried out as following:

Organic Rankine cycle—electrical energy production in vapor generator (a), liquid working medium after receiving external heat (from heat sources, for example, exhaust gases), boiling and creating high pressure vapor; for example at 300° C. temperature and pressure of saturated vapor equals 8.0 MPa.

Lines (4-1-2) in the diagram in FIG. 2 present the heating and boiling of working medium. Further working vapor is streamed into turbine (b). After work production, the vapor pressure decreases from value Pw in evaporator to value Pc in condenser (point 3). Line (3-4) represents vapor condensation and lines (4-1-2) represent working medium heating, boiling and overheating; this closes the cycle.

Refrigerating cycle—heat sink from condenser (c). Lines (9-5-6) represent heating, boiling and overheating of the same working medium that works in direct cycle. Line (6-7') shows isentropic expanding of working vapor in the nozzle of jet-flow compressor (f) and pressure decrease in isentropic process from $P_{wr}$ to value $P_{or}$ in a condenser (c). For example, at a temperature in evaporator (i) from (+)5° C. to (−)35° C.

In excess of input heat in the system, possible reduction of boiling temperature in condensing system is up to negative values, for example to (−30°) C. In this case, turbine work increases accordingly generating more electricity or mechanical energy. Line (7'-7) represents mixing of incoming vapor from heat exchanger system (i) of condenser (c) and hot vapor in inlet chamber of jet-flow compressor (f).

After ejecting nozzle, which is coaxial with ejecting nozzle, a cold vapor flows into mixing chamber of jet-flow compressor, where cold and working vapors are mixed.

After mixing, vapor has unified parameters, defined by point (7) on mixing line, (before diffuser of compressor (f).

Regarding the mixture of working and cold vapors, the mixed vapor is compressed, line (7-8), up to condensing pressure $P_{oc}$ in condenser (g).

By means of heat sink system (i), vapor is condensed and converted into liquid, line (8-9).

As condensing temperature in condenser of direct cycle does not depend on ambient environment, it is possible to program this temperature (as said before) in range, for example, from (+)5° C. to (−) 30° C., increasing by this way the efficiency of the system of the present invention.

The working medium is delivered into heat exchange system (i) by pulses—line (9-10) with a pressure corresponding to temperature of condensation, i.e. 2-5 degrees Celsius lower than condensing temperature in main condenser (c).

For jet-flow compressors calculation, gas dynamic functions are used. They connect dimensionless adiabatic vapor velocity with thermodynamic parameters.

Dimensionless adiabatic vapor velocity is $$\lambda = \omega_a / a_{cr} \tag{3}$$

where: ωa—adiabatic velocity, m/sec;
$a_{cr}$—critical (local sound) velocity, m/sec.
$a_{cr}$ is calculated by $$a_{cr} = \sqrt{2k/(k+1)} \times \sqrt{P_b \times V_b} \tag{4}$$

where: k—adiabatic parameter of ideal gas k=$C_p/C_v$;
$P_b$— total pressure, Pa;
$V_b$— gas specific volume under total pressure, m³/kg.

As a working medium is a real gas, adiabatic (isentropic) parameter "k" is a variable value. Then, possible definition of conditional adiabatic parameter is as follows:

$$k_y = \sigma_{sy}/(\sigma_{sy}-1) \tag{5}$$

where: $\sigma_{sy} = (i_7 - i_{7'}) \times (p_{7'} \times v_{7'} - p_8 \times v_8)$;
Also other ways for "$k_y$" calculation exist.

For technical calculations it is possible to use Laplace formulae:

$$\alpha = \sqrt{(\Delta P/\Delta \rho)_s} \tag{6}$$

where: α—mean sound velocity in gas pressure change interval;
ΔP—small isentropic pressure change;
Δρ—final density change at pressure change.

Gas velocity in entrance to jet-flow compressor is negligible and may be ignored, thus gas flow velocity at adiabatic expansion is defined by formulae:

$$\omega_a = \sqrt{2(\Delta i)_s} \tag{7}$$

where: $(\Delta i)_s$—isentropic change of flow enthalpy J/kg.

if, $\omega_\alpha = a = a_{cr}$ then $(\Delta i_{cr})_s = 0.5(\Delta P/\Delta \rho)_s \tag{8}$ Critical gas flow velocity $$a_{cr} = \sqrt{2(\Delta i_{cr})_s} \tag{9}$$

where $(\Delta i_{cr})_s$—is calculated according to the next procedure:

On P-i diagram with parameters $P_o$, $i_o$, defining total working medium conditions, draw isentropic line in a parallel to S-const entropic line. Next, they draw a number of isobar lines $P_1, P_2, P_3 \ldots, P_n$ in intervals of $[P_w > P_o]$. $\Delta P = (P_1 - P_2); (P_2 - P_3)$ and so on, and find $(\Delta P/\Delta \rho)_s$, $\Delta i_s = i_{co} - i$,
where $i_{co} = (i_1 - i_2)/2$ or $i_{co} = (i_2 + i_3)/2$ and so on.

Compare values $(\Delta i_{cr})_s$ with $(\Delta P/\Delta \rho)_s$ which satisfy the equation: $(\Delta i_{cr}) = 0.5(\Delta P/\Delta \rho)_s$—this represents isobar which passes enthalpy point $i^1$, defining critical pressure of gas flow $P_{cr}$.

Explanation: Relation of flow velocity to critical velocity is $\lambda = \omega/a_{cr}$,
where $a_{cr} = a_b\sqrt{2/(k+1)}$; $a_b = \sqrt{KgRT} = \sqrt{KP/\rho}$;
Total temperature—$T_b = i_b/C_p$, where $i_b = i + \omega^2/2$ g.

Function τ(λ)—relative temperature is ratio of static and total temperature:

$$\tau = \frac{T}{T_B} = 1 - \lambda^2(K-1)/(K+1) \tag{10}$$

Function π(λ)—relative pressure, ratio of static and total $$\pi = \frac{p}{p_b} = [1 - \lambda^2(K-1)/(K+1)]^{(k-1)} \tag{11}$$

Function ξ(λ)—relative gas density, ratio of static gas density in certain flow section to total gas density:

$$\xi = \frac{\rho}{\rho_B} = \left[1 - \frac{\lambda_B(K-1)}{K+1}\right]^{1/K-1} \tag{12}$$

Function Q (λ)—relative section, ratio of critical flow section to certain flow section:

$$Q = \frac{f_{cr}}{f} = \left(k + \frac{1}{2}\right)^{1/k+1} \lambda \left(1 - \frac{k-1}{k+1\lambda^2}\right)^{\frac{\Delta}{k}-1} \tag{13}$$

Figure 3:
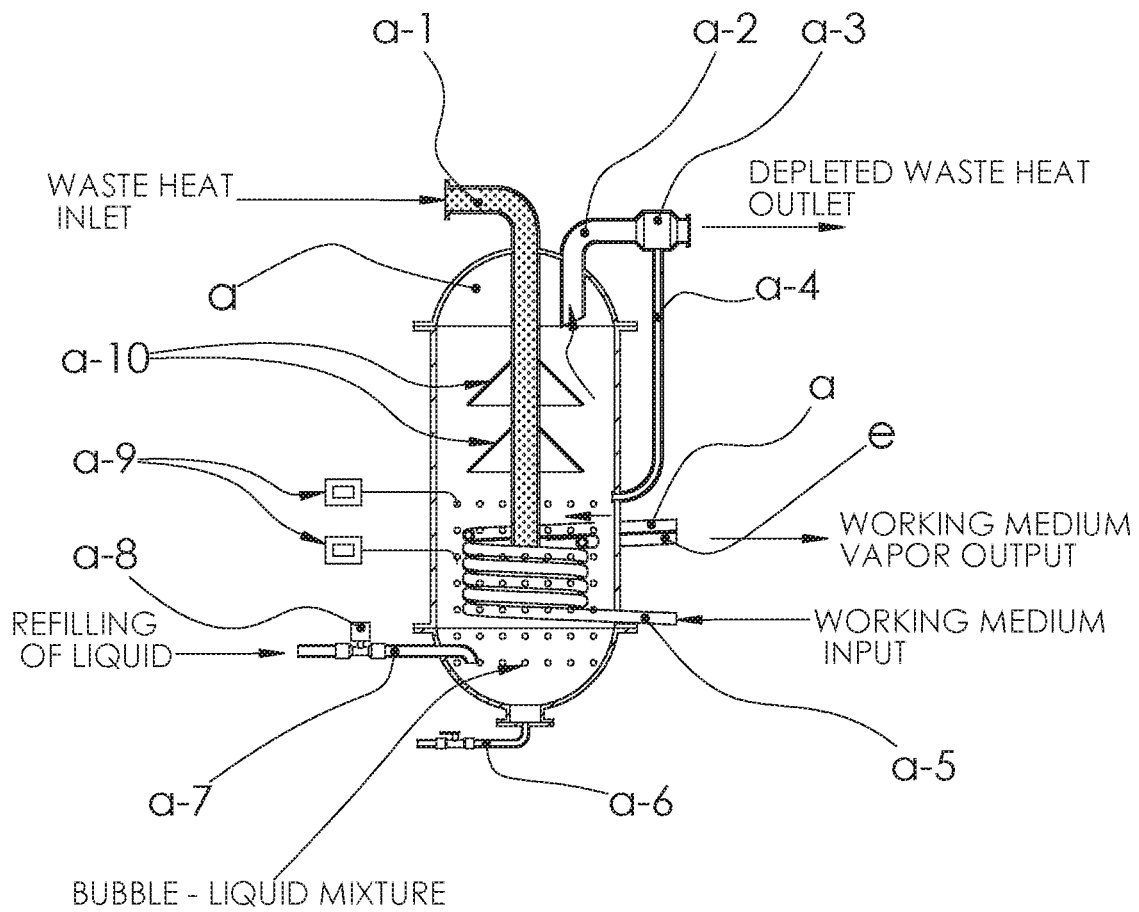
FIG. 3 is schematics of vapor generator.

FIG. 3 is a schematic representation of impact foam vapor generator, working with gas turbines (or any other) waste heat sources. The following describes the device parts: provision of hot waste or any other heat input (a-1); outlet of heat depleted exhaust gases (a-2, a-3) to atmosphere; spillage tube (a-4); two evaporators bodies (a, e), while evaporator body (a) serves for feeding vapors of working medium to turbine of direct Rankine cycle, further evaporator (e) serves for feeding vapors of working body to jet-flow compressor of reverse refrigerating cycle further input (a-5) for liquid working medium from pressure amplifier (d); liquid emptying valve for service works (a-6); filling solenoid valve of liquid (a-8) via channel, for instance, tube (a-7); level sensors (a-9); foam return dishes (a-10).

The Following Details the Vapor Generator Work Description:

An input waste (or any other) heat vapor generator comprises hollow sealed vessel, i.e., vapor generator (a), where bottom half (or other volume portion) of which is filled with liquid, for instance water, and upper half (or other volume portion) is filled with gaseous waste (or any other waste heat source) heat gases. The hollow sealed vessel comprises a central inlet channel (similarly shaped as a tube) (a-1) and partially submerged in the liquid. This inlet is configured to stream waste heat gases inside the vessel. The end of the entrance tube comprises a swirling device, giving the entering hot gases a rotating motion. Further to this fast entering into the liquid, the hot gases create actively bubbling rotating foam and liquid mixture, which performs effective heat transfer from hot foam to absorbing vapor generator (a-5) in which working medium of direct Rankine cycle flows and converts into gaseous phase, leaving the exchanger exit to turbine (b, FIG. 1) with increased energy, pressure and temperature. Further evaporator (e) performs the same process and evaporates gaseous working body and feeds it to jet-flow compressor (f, FIG. 1) of reverse refrigerating cycle. Further entered waste (or any other source) hot gases after transmission of its heat to vapor generators (a, e) leave vapor generator vessel in temperature depleted condition by means of channel (a-2) out to ambient atmosphere, while residual foam sinks and returned to vapor generator by means of small sink buffer (a-3) and liquid return tube (a-4). Further two or more (depending on heat vapor generator (a) volume) conical dishes (a-10) assist in returning foam to a process volume downwards. Next, level measurement units (a-9) in communication with solenoid valve and programmed controller, automatically keep required liquid level in vessel. Further manual valve (a-6) serves for service liquid emptying of the vessel. Solenoid valve (a-8) and pipe (a-7) serves for vessel filling with a liquid (water or other liquid), while level measuring sensors gives opening/closing signals to solenoid valve (a-8).

Further, the process of flowing hot waste heat through liquid-foam mixture permits CO and $CO_2$ components of waste heat organic fuels burning by-products capturing in liquid contained in vapor generator vessel. For that special captive additives are added to liquid.

In the device used in the present invention, a property of working medium (R-134a or R-245fa or any other appropriate gas) is to generate foam at certain flow conditions. Impact-foaming method in heat exchangers application gives significantly increased heat transfer. Thanks to working medium liquid intensive turbulent component of working medium, the following advantages are achieved:

reduction of diffusion and thermal resistances;
high increase of specific contact area in heat transfer;
highly developed contact surface between phases;

Impact-foaming heat exchangers have the advantage of better effectiveness in cyclone heat exchangers, and are also superior to just foaming devices due to reduced aerodynamic resistance.

Some example values of the process are listed below:
vapor velocity—5.0 m/sec;
height of foam layer—300 mm;
liquid/gas ratio—2.5 kg/kg It is recommended to place a helix (a-5) inside the apparatus for reducing sections dimensions of the apparatus, providing better liquid turbulence and better homogenization of foam in two-phase layer.

For compressor pressure ratio $\xi=3.0$ the pressure will reach about P=101,300×3=303,900 Pa. By installing evaporator into exhaust channel of gas turbine, the pressure losses in exhaust increases only in about 0.01 bar.

Figure 4:
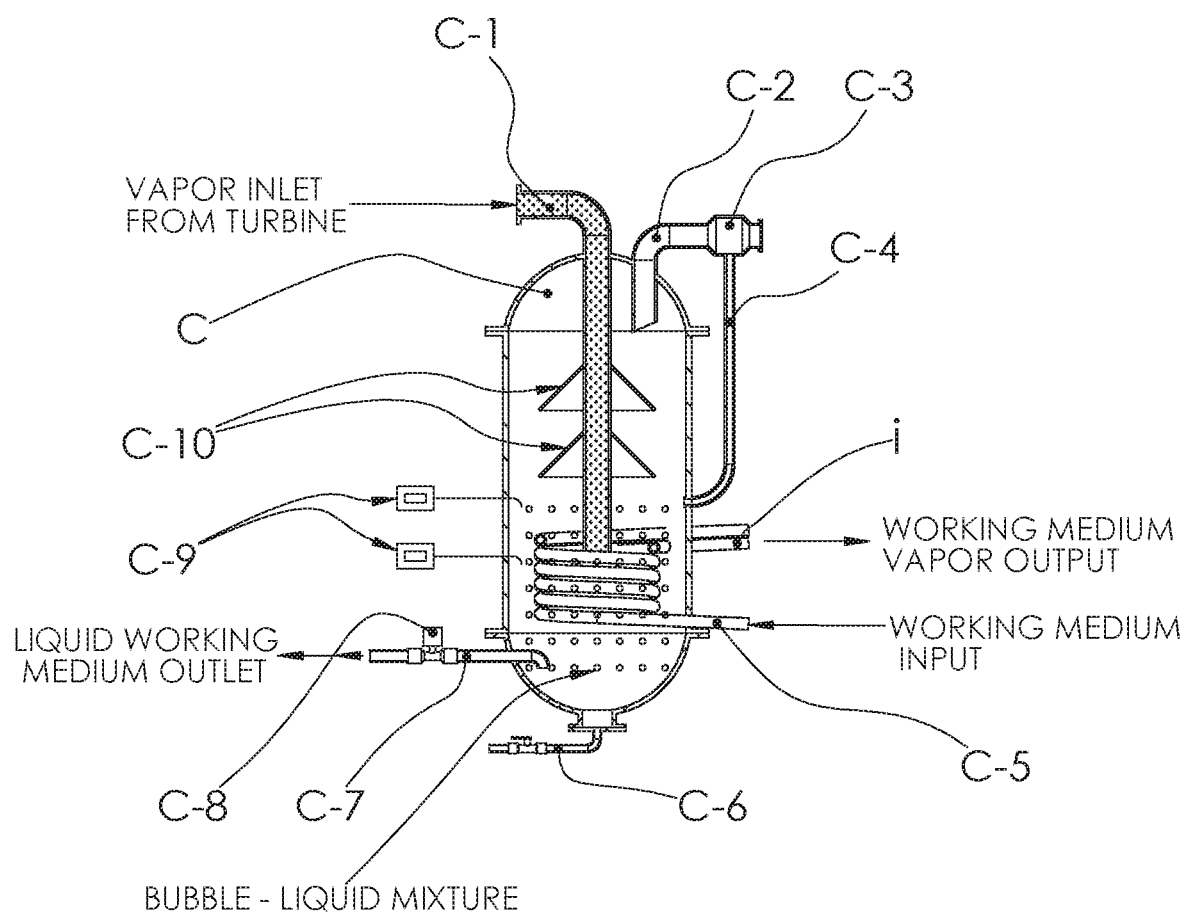
FIG. 4 is schematic of condenser.

FIG. 4 is schematic representation of condenser. This device combines all three elements in one apparatus. In currently used condensers, heat is removed by means of ambient-nature heat absorbing entities, like water or air. Usage of ambient entities for heat transfer out has some drawbacks, which are listed below:

impossibility to reduce condensing temperature below ambient temperature and by this to increase effectiveness of the process;
applying the system in waterless regions, forcing addition of complicated cooling solutions, like powerful ventilators or additional pump stations;
consumed excessive energy for pumps or chillers (above 10% of produced energy);
changing ambient conditions during day-night or winter-summer times brings about to condensation temperature sharp changes and to power system not effective and not stable work regime;
required additional automatic circuitry and hardware for monitoring and maintenance of constant work conditions;
the system requires additional metal constructions;
system erection cost and its exploitation expenses increases.

The above described drawbacks are resolved in the system of the present invention by means of applying a reverse cycle, in which the evaporator (heat removing device) is placed in the condenser, for instance in the form of coil-pipe, and streams out "cold" vapor performed by jet-flow compressor. While condensing, temperature is maintained in constant value, for instance of +5° C.÷−30° C. by means of pulsing flow regime.

Usage of condenser is effective while utilizing waste expelled heat, exhausted by power producing systems.

Condenser—Description of Device Operation:

A Direct Rankine cycle condenser, comprises hollow sealed vessel (c in FIG. 4), where its bottom half (or other volume portion) is filled with working medium of direct Rankine cycle, and upper half (or other volume portion) is filled with gaseous phase of working medium. The sealed vessel farther has a central inlet channel (such as a tube) (c-1) is partially submerged into the liquid phase, for instance, into a third of the liquid level, by means of which hot gases stream from turbine (b) outlet (point 3, FIG. 1), into the said vessel. Further said liquid and fast entrance of hot gases to this liquid creates actively bubbling foam, receiving rotating motion by means of spiral fins at the end of entrance channel (c-1), which performs effective heat transfer from hot foam to absorbing heat exchanger (i), (c-5) to which working liquid gas of secondary refrigerating cycle inflows by means of pulse feeding system (h) with low pressure. Consequently, this gas is heated by absorbing heat from the hot foam and converts liquid gas into gaseous phase, leaving to jet-flow compressor sucking channel at the exchanger exit, point (7'). Farther hot bubbling foam loses its heat by transferring it to heat exchanger (i), condenses and sinks into the liquid part of the condenser bottom, while residual foam sinks and returns to condenser by means of small sink buffer (c-3) and tube (c-4). Further, two or more (the number of which depending on heat receiver (c) volume) conical dishes (c-10) assist in returning foam for further processing downward in the vessel volume. Then the foam passes to the vessel level measurement units (c-9) in pair with solenoid valve, automatically keeping the required level of working medium in the vessel, where further manual valve (c-6) serves for liquid emptying of the vessel.

Figure 5:
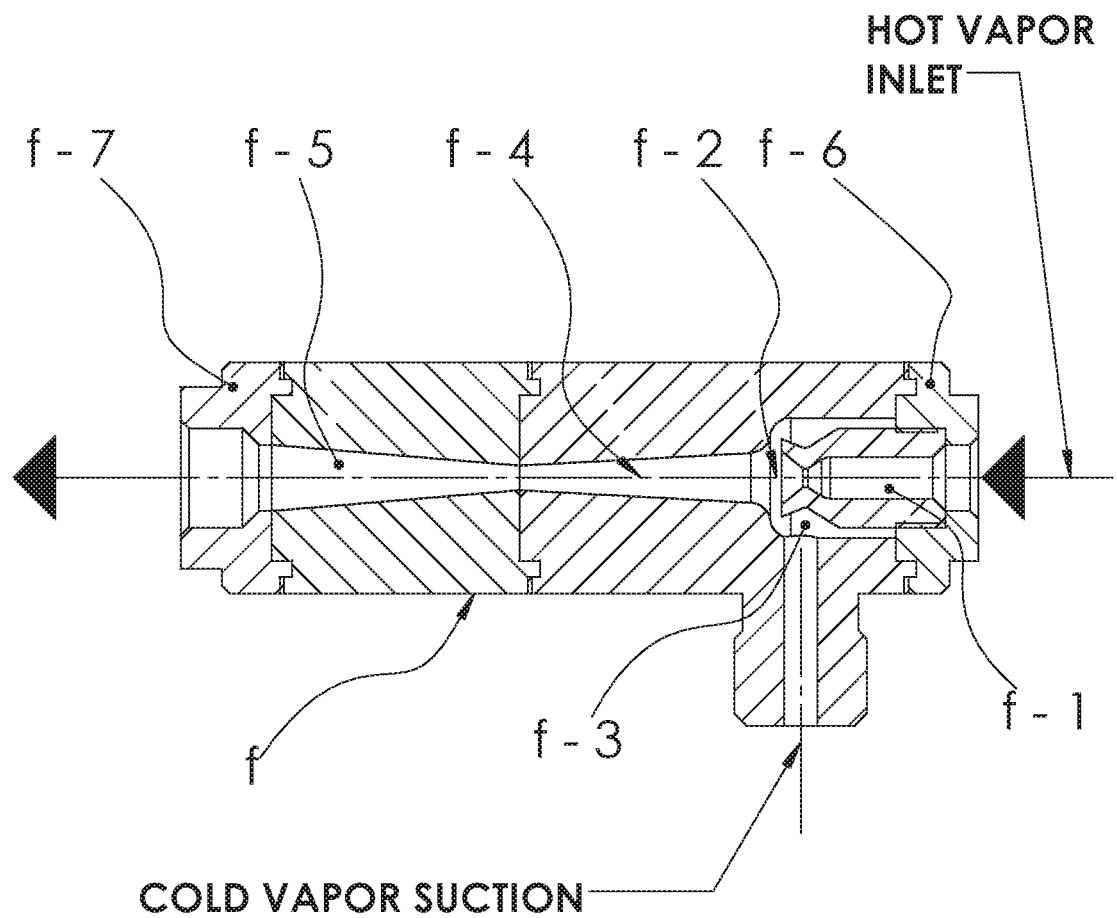
FIG. 5 is schematics of jet-flow compressor.

FIG. 5—Jet-Flow Compressor (1) Schematic Representation.

Jet-flow compressor with separate nozzle (f-1), critical diameter of which may be defined by means of gas dynamic functions or any other method (see above), and receiving nozzle (f-2), performed integrally with receiving chamber (f-4). The receiving chamber (f-4) can be of cylindrical or conical form with inlet/outlet diameters ratio (for conical form), for instance, 1:1.22; with diffuser part (f-5) that has outlet diameter ratio to receiving chamber (f-4) outlet diameter as 1:2.5. The length of the diffuser part comprises, for instance, 10÷12 lengths of the receiving chamber (f-4). All parts of the jet-flow compressor perform as an integral assembly.

Ejecting nozzle (f-1) and receiving nozzle (f-2) may be performed with conical inlets, which significantly reduces flow resistances by reducing turbulent knurls in flow and reduces detaching of flow from nozzles walls.

Outlet pane of ejecting nozzle (f-1) can outstand from receiving chamber inlet in a distance, for instance, of 3.6 $D_{cr}$—critical diameter of ejecting nozzle (f-1).

The ejecting nozzle performs a diffusing shape if vapor flow velocity above a critical diameter exceeds sound velocity, V≥M, where M is 1 Mach of vapor velocity.

The length of the diffusion part of the nozzle may equal 2÷3≥$D_{cr}$, critical nozzle diameter. Jet-flow compressor with parts (f-1), (f-4), (f-6), (f-7) performs as an integral assembly. This enables easy maintenance, quick change procedure of worn out parts and simple change of ejecting nozzle for other gases with different parameters and for different regimes of work.

Figure 6:
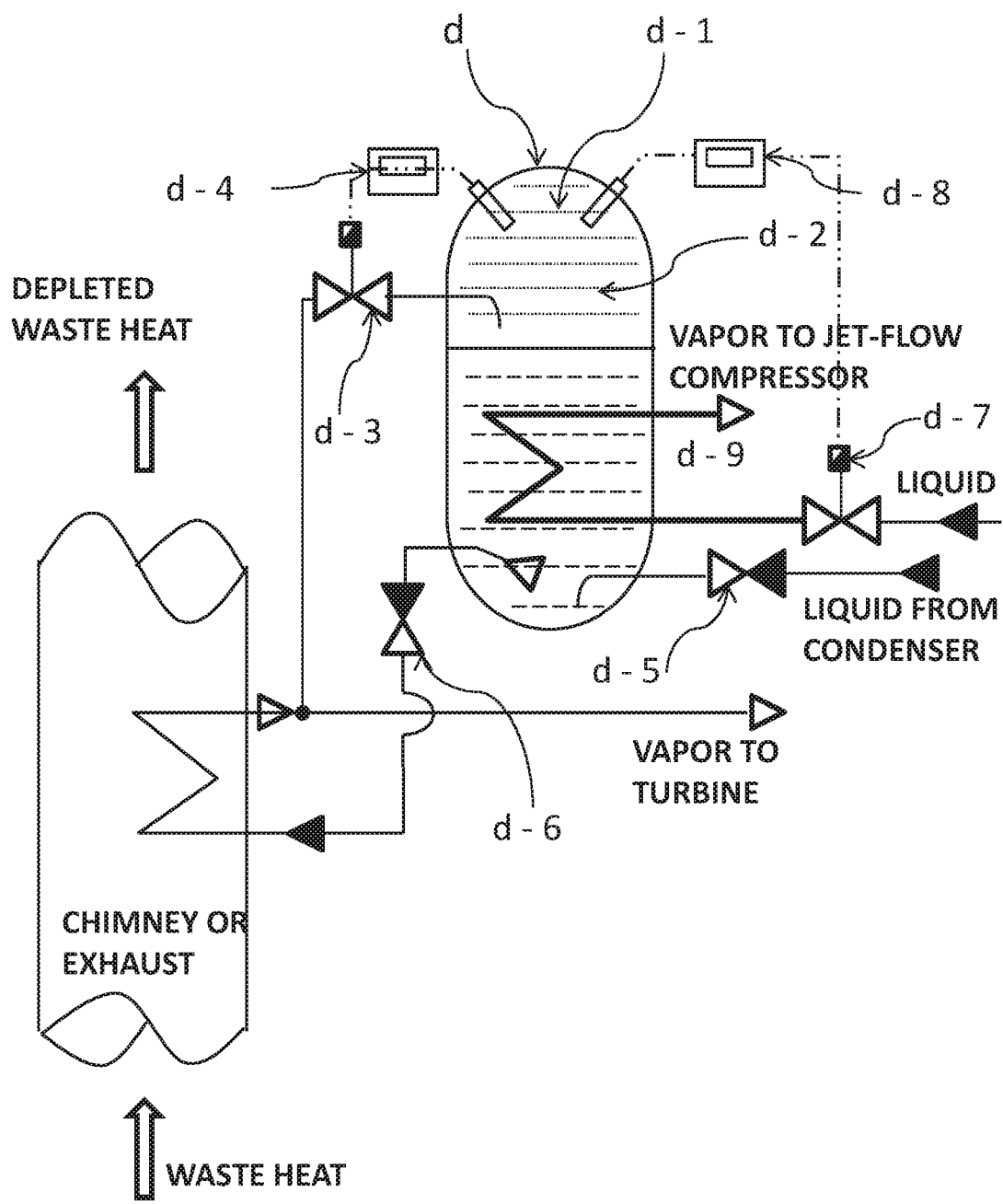
FIG. 6 is schematic of pressure amplifier.

FIG. 6—Pressure Amplifier (d) Schematic Representation

This device serves for streaming of the working medium from condenser-receiver-cooler (c) to evaporator (a), instead of a mechanical pump.

The pressure amplifier is configured to perform according to the following basic work process parameters:
- outlet condenser vapor pressure is about 0.375 MPa, at condensing temperature, for instance, +7° C.; and
- evaporator pressure is 8 MPa, for instance, at defined vapor temperature of 300° C.

For streaming vapor at low pressure to volume with high pressure it is possible to use (for instance, working medium R-134a) a hermetic mechanical pump as a traditional solution.

This solution, however, has the following drawbacks:
- complicated technical solution;
- mechanical drives, which consume significant electrical energy;
- requires necessary electrical and electronic drivers;
- limited service life due to wearing of mechanical parts;
- quick wear out of dynamic seals and often service works, which interrupts continuous system work;
- high cost of the pumps.

Improved Pumping Solution According to the Present Invention

The pressure amplifier of the system of the present invention removes all of the drawbacks listed above. Essentially, this pressure amplifier uses vapor pressure in evaporator for pressure raise of liquid condensate to pressure value at which this liquid can enter into the evaporator. To some extent, the liquid pressure at the inlet to the evaporator is required to be higher than the pressure inside the evaporator. This requirement is fulfilled by placing pressure amplifier higher than the evaporator placed, in such way, that some pressure edge of 100÷200 water height is achieved.

Description of the Pressure Amplifier

The pressure amplifier (FIG. 6—(d); FIG. 1—(d), (k)) comprises the following components: The vessel (d-1) has a free space and is periodically connected to the high pressure vapor stream (from the evaporator) (FIG. 1—a; e) through automatic threshold valve (d-3), for instance time relay or pressure relay combined with non-return valves.

In pressure amplifier, for speeding the pressure fall down, it is possible to place a heat exchange surface, for instance in the form of helical tube. Heat exchange surface on the liquid inlet is connected with pulsing system (d-7, d-8), similar to h (FIG. 1), and on its outlet (d-9) vapor is sucked by jet-flow compressor, similar to (f) (FIG. 1) and out streamed to condenser (c; g) (FIG. 1). In this arrangement it is necessary to place the jet-flow compressor in close vicinity with the heat exchange system, for instance at distance like 100÷ 150 mm, while its sucking inlet must be without any bends.

Operating Principles of the Pressure Amplifier

Into pressure amplifier is periodically streamed liquid working medium of low pressure. The volume of incoming liquid equals a free space of the evaporator receiving chamber. After filling the required volume, high pressure vapor from evaporator is streamed into it, substituting the liquid in the pressure amplifier and forcing the liquid into the receiving part of the evaporator. After emptying the pressure amplifier, actuated heat exchanging and pulsing system with its automatic control system and jet-flow compressor is done by means of which vapor of working medium is sucked out and streamed into the condenser.

Streaming of the liquid working medium into heat exchange system is performed periodically by pulses, for instance for pressure which is appropriate to selected boiling temperature of +5° C.÷ 7° C. with a pressure difference of 0.01 to 0.04 MPa.

Cooling temperature in receiver part, for instance, reaches +10 to +12° C. and accordingly equals the temperature and pressure in the heat exchanging part of the condenser. As a result, the liquid working medium is self-drained into the receiver part of the pressure amplifier.

Figure 7:
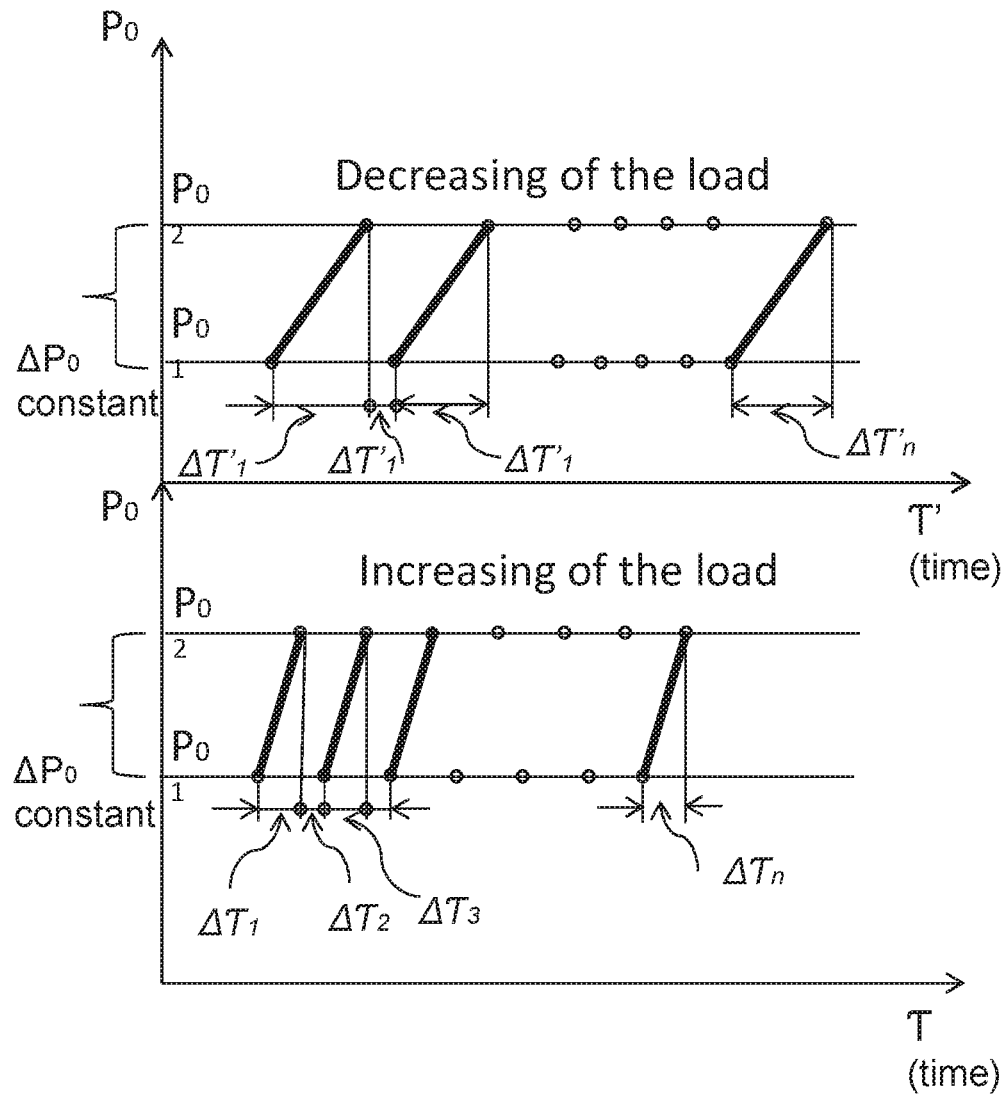
FIG. 7 is an operation diagram of impulse actuators.
Figure 8:
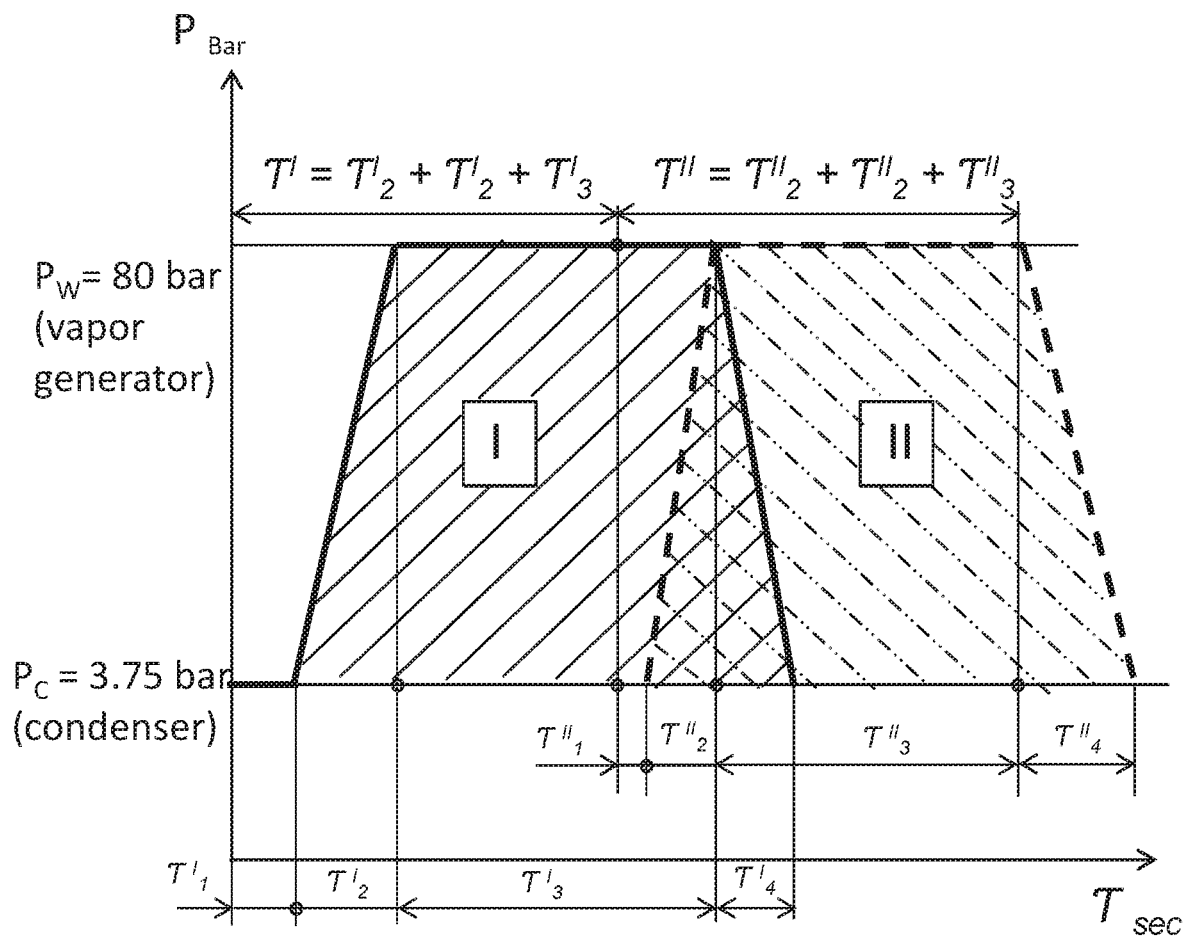
FIG. 8 is an operation diagram of pressure amplifier.

FIG. 7 displays a chart consistent with the scheme in FIG. 8 showing that the inverse cycle of heat extraction from the condenser pressure and temperature condensation and evaporation of the working medium are kept constant and their values are preprogrammed in advance. When load increases pulse frequency of the working medium supply also increases. When load decreases pulse frequency of the working medium supply decreases. During load decreasing or increasing, fibrillation of instruments of control system is absent, where the fibrillation phenomenon is the characteristic feature for conventional control systems. Thus, the system of the present invention provides a solution that enables to keep constant condensation and evaporation temperatures. This improves operation of the device and does not depend on ambient conditions.

FIG. 8 shows the operation process of the pressure amplifier that has the following time periods:

$$\tau_{tot}=\tau'_1+\tau'_2+\tau'_3+\tau'_4 \quad (14)$$

Where $\tau'_1$—time period for filling liquid volume (measured in seconds);

$\tau'_2$—time period for which preliminary condensation pressure ($P_c$) reaches the pressure in evaporator ($P_w$) (namely, hydrostatic pressure of 150 mm of water height) (measured in seconds);

$\tau'_3$—time period for which liquid drain occurs (measured in seconds);

$\tau'_4$—time period for which pressure $P_w$ in a vapor section of pressure amplifier falls down to a value of vapor condensation $P_c$ (measured in seconds).

Pressure reducing in the pressure amplifier should reach pressure that is lower than $P_c$ in order to overcome pressure losses in tubing and other local resistances, like valves, bends etc. For instance, $P'_c=P_c-150$ mm of water gauge.

For continuous work of evaporator, its receiving part must be twice in volume than the required value. When 50% of the volume of the receiving chamber of the evaporator is used, the working medium from the receiving part of the pressure amplifier begins to deliver. Volume of the pressure amplifier receiver part comprises 50% of the working medium liquid volume, streamed from the pressure amplifier to the receiver part of the evaporator. This solution enables continuous and even work of evaporator, averaging of the working medium temperature, and also automatic reduction of vapor volume at reduction of power load.

Combined system for conversion of heat energy into electrical energy operates as described below (see FIG. 1).

Main vapor generator (a) receives waste heat from exhaust gases expelled out by main turbine (or by any other heat source) and transfers it said heat to the working medium.

The working medium boils, providing high pressure vapor (for example, in case of usage of "R-134a" and boiling temperature, of +300° C., $P_w$=8 MPa). Working vapor with pressure $P_w$ enters into turbine (b). The turbine is driving an electro-generator that creates electrical energy. Vapor is streamed into condenser (c) after the turbine by means of heat absorbing system, which includes jet-flow pump (f), evaporator (i) and impulse device (h), thereby condensed into liquid. Condensing pressure $P_c$ is adjusted so as to provide maximum energy extraction from the input waste heat (in this case, maximum electrical energy is generated).

In the example described here, condensing temperature of +7° C. and condensing pressure of 0.375 MPa are assumed. However, in case of a large amount of waste heat, it is possible to reduce condensing pressure ($P_s$) to 0.029 MPa and reach 50% of thermal efficiency of Rankine cycle that represents maximum value of efficiency for steam turbines. For this efficiency of water vapor using systems the following vapor parameters are required:
turbine input vapor pressure—30 Mpa;
temperature—+600° C.;
condensing pressure—$P_c$=0.003 MPa.

Comparison of the Rankine cycle which uses R-134a with Rankine cycle of the steam turbine or with open cycle of gas turbine gives the following results:
A. Rankine cycle on vapor R-134a: Vapor temperature— $T_w$=300° C.; Pressure—$P_w$=8.0 MPa; Condensation temperature—$T_c$=+7° C.÷(−)5° C.; Condensing pressure— $P_c$=0.375 MPa; Thermal efficiency—$\eta_R$=30÷ 50%.
B. Rankine for steam turbine: Vapor temperature—$T_w$=500° C.÷ 600° C.; Pressure—$P_w$=9.0 MPa; Condensation temperature—$T_c$=+29° C.; Condensation pressure—$P_c$=0.004 MPa; Thermal efficiency—$\eta_R$=42%.
C. Gas turbine open cycle: thermal efficiency—$\eta_R$=28÷ 29.5%

Additional advantage of the combined system of the present invention is that in comparison with steam and gas turbine, the combined system does not consumes any organic fuel, but rather uses expelled to atmosphere waste heat.

Figure 9:
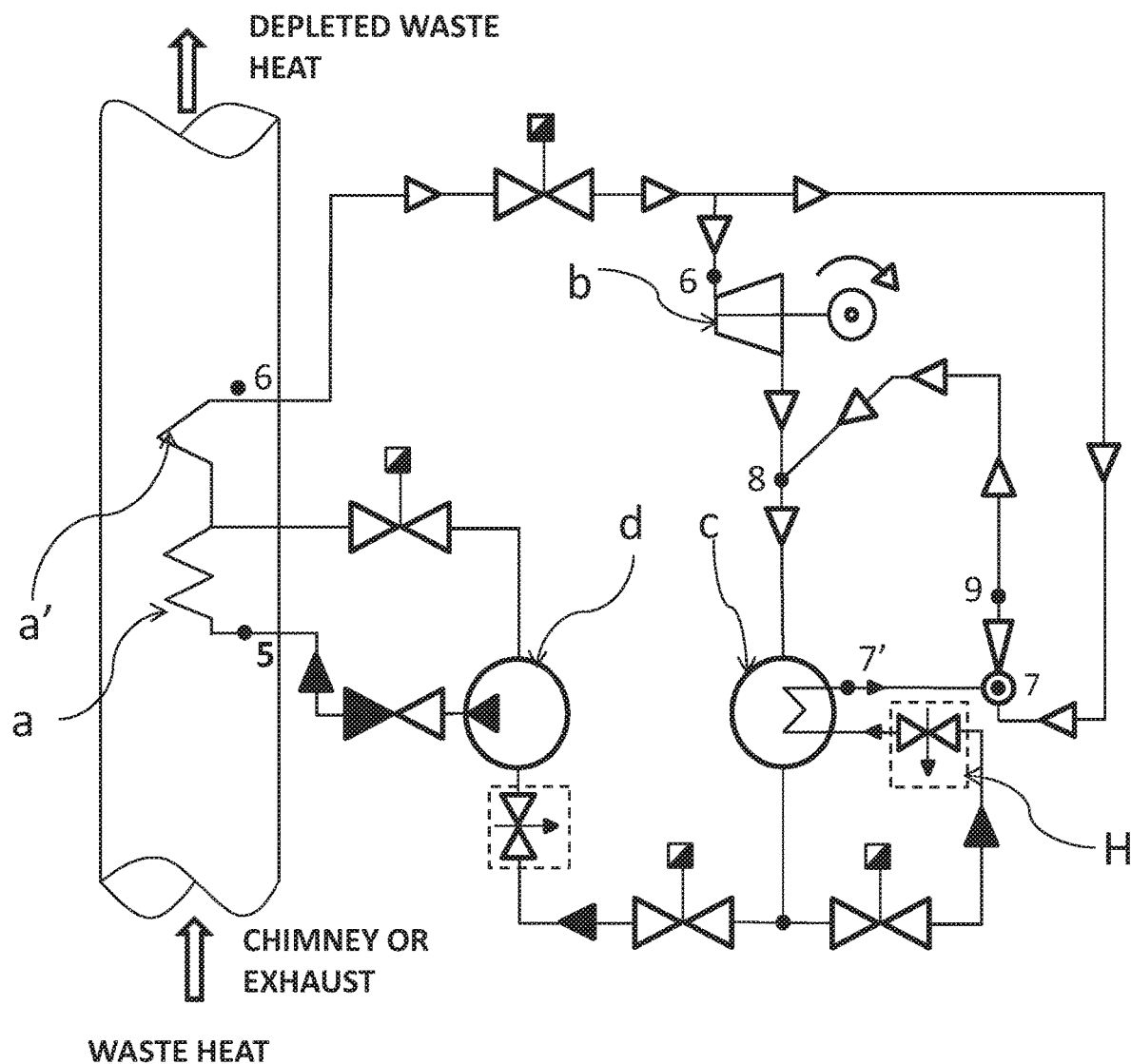
FIG. 9 is schematics of combined one-contour Organic Rankine and Refrigerating cycles for smaller to medium power outputs.

FIG. 9. Principles Description:

The working principles of scheme in FIG. 9 are the same as in scheme in FIG. 1, excepts that both direct (Rankine) and reverse cycles are unified in one closed contour.

Example—Turbine Cycle (Electricity Generation)
Thermal efficiency coefficient (TEC):

$\eta_{turb}/l_{turb}/q_{WG1}$=154/510.6=0.3(30%) where —;
$l_{turb}$=($i_2$−$i_3$)=720−566=154 kj/kg $l_{turb}$—theoretical work in turbine, kj/kg
$q_{WG1}$=$i_2$−$i_1$=720−209.4=510.6 kj/kg; $_{WG1}$—isothermal boiling of the working medium and isobaric vapor overheating in evaporator, kj/kg.

Reverse Cycle (Jet Flow Compressor).
Theoretical reverse cycle coefficient:

$$\xi_o = \frac{q_o}{l_o} = \frac{173.6}{50} = 3.47.$$

$q_o$—thermal sink of main condenser in direct cycle;
$q_o$=($j_7$−$j_{16}$)=430−256.4=173.6 kJ/kg;

$l_c$—theoretical work of jet flow compressor,
$l_c$=($i_8$−$i_7$)=480−130=50 kJ/kg.

Actual Thermal Coefficient of Combined Cycles
$\zeta$=$\eta_c$*$\xi_c$*$\eta_m$*$\eta_e$*$\eta_w$=0.3*3.47*0.8*0.96*0.94=0.75 (75%)

where: $\eta_m$—turbine losses, $\eta_m$=0.8
$\eta_s$—losses in electricity generator, $\eta_s$=0.96;
$\eta_w$—thermal losses, $\eta_w$=0.94.

In the case of the combined system of the present invention with working medium R-134a:
Direct Cycle (Rankine) Operation:
Working medium heating in evaporator $WG_1$ till 300° C., working pressure $P_w$=8.0 MPa (80 bars);
Condensation temperature +7° C.
Reverse Cycle:
Working medium is heated in evaporator $EG_2$ till 80°±1° C. and working pressure 2.63 MPa (26.3 bars);
Evaporating temperature in evaporator of main condenser is +5°÷−1° C.;
Condensing temperature in auxiliary condenser is +40° C.

Example of theoretical calculation of thermal coefficient is carried out on the basis of theoretical cycle (FIG. 1) and scheme of combined cycle with jet-flow compressor with use of process points (FIG. 2) and is presented in Table 1.

TABLE 1

| Parameters | Station Points | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| | Direct cycle (Rankine) | | | | Reverse cycle | | | | | |
| P, MPa | 8.0 | 8.0 | 0.375 | 0.375 | 2.63 | 2.63 | 0.349 | 1.01 | 0.349 | 0.349 |
| (Bar) | (80) | (80) | (3.75) | (3.75) | (26.3) | (26.3) | (3.49) | (10.1) | (3.49) | (3.49) |
| T, K | 573 | 573 | 280 | 280 | 353 | 353 | 278 | 313 | 313 | 278 |
| (° C.) | (300) | (300) | (7) | (7) | (80) | (80) | (5) | (40) | (40) | (5) |
| Enthalpy J KJ/kg | 209.4 | 720 | 566 | 209.4 | 256.4 | 430 | 430 | 480 | 256.4 | 256.4 |
| V, m³/kg | — | 0.00625 | 0.01511 | — | 0.00646 | 0.0625 | — | 0.025 | 0.0199 | — |

Notes: in case of excess waste heat amount, for reducing of backpressure at turbine work, and for increasing of useful energy extraction from waste heat, it is possible to reduce condensation temperature to (−)35° C. or even to (−) 40° C.

In this case, it is possible to reach efficiency up to 50% in direct cycle, with coefficient of heat utilization up to 80%.

In regular vapor power systems, the total heat usage reaches only 39%.

Series of tests which were performed on the working physical model, based on described here technology, showed that:

efficiency of direct Rankine cycle is 30÷ 50%;
thermal coefficient of heat usage is ξ=0.75÷0.8;
weight of the power system in comparison with conventional units was reduced significantly;
noise of the power system was reduced up to 30 DB;
the system enables increasing power without usage of organic fuel;
improving ecology;
reducing energy cost up to 50%;
short refunding period (less than 2-3 years);
reducing installation period on behave usage of factory ready-made system modules.

The invention claimed is:

1. A combined power plant for producing electrical energy from an energy source comprising:
   a direct (Organic Rankine) cycle configured for producing electricity; and
   an inverse (refrigerating) cycle,
said direct (Organic Rankine) cycle and inverse (refrigerating) cycle are independent one from the other and in thermal communication with each other,
wherein said direct (Organic Rankine) cycle comprises:
   an input waste heat vapor generator (a);
   a turbine (b) with electrical generator;
   a condenser (c);
   a pressure amplifier (d); and
   a non-return valves (m),
wherein fast entering of said waste heat gases or liquid into said vessel (a) creates actively bubbling foam and hot bubbling foam-liquid mixture, said actively bubbling foam performing effective heat transfer from said hot bubbling foam-liquid mixture to an absorbing heat exchanger (a and e) in which low boiling temperature working medium of direct (Organic Rankine) and inverse (refrigerating) cycles flows and converts into vapor,
wherein said condenser is configured to mix hot gases streamed from outlet of said turbine (b) with liquid, wherein said hot gases and liquid create actively bubbling rotating foam mixture and performing effective heat transfer from hot foam to an absorbing evaporator and an evaporator (i).

2. The combined power plant according to claim 1, wherein said direct (Organic Rankine) cycle and inverse (refrigerating) cycle obtain energy from same said energy source.

3. The combined power plant according to claim 2, Wherein said energy source is a waste heat energy source.

4. The combined power plant according to claim 1, wherein said inverse (refrigerating) cycle is configured to lower temperature and corresponding pressure of a working medium of said direct (Organic Rankine) cycle and increase temperature and corresponding pressure difference between input hot temperature and corresponding pressure of said working medium in gaseous phase and maximal low temperature and corresponding pressure of said working medium in a condensed liquid phase for increase of electricity generated amount in said direct (Organic Rankine) cycle, wherein a working regime in said combined power plant is independent of ambient temperature and pressure of the surrounding.

5. The combined power plant according to claim 1, wherein said input waste heat vapor generator comprises:
   a hollow sealed vessel (a), wherein one volume portion thereof is configured to be filled with liquid and second volume portion thereof is configured to receive incoming gaseous or liquid waste heat;
   a central inlet channel (a-1) in said vessel which is configured to be partially submerged in said liquid and a swirling gas or liquid flow device at its end, wherein waste heat gases or liquid are streamed inside of said vessel with rotating movement by said swirling gas or liquid flow device and creating impact foam rotating bubbling;
   a heat receiver which performs as a pair of separate heat exchangers (a and e) is configured for receiving flow of and converting said working medium of said direct (Organic Rankine) and inverse (refrigerating) cycles into vapor;
   a channel (a-2) configured for releasing said gaseous or liquid waste heat to ambient atmosphere in heat and temperature depleted condition;
   a sink buffer (a-3) configured for receiving a residual liquid;
   a liquid return tube (a-4) configured for return of said residual liquid into a vessel of said vapor generator;
   conical dishes (a-10) configured for returning said liquid to a process volume downward;
   a level instrument unit (a-9) in pair with solenoid valves and controller, configured to keep required liquid level in said vessel (a);
   a solenoid valve (a-8) and inlet channel (a-7) configured for filling said vessel (a) with liquid; and
   a manual valve (a-6) for emptying said liquid from said vessel (a).

6. The combined power plant according to claim 5, wherein said one volume portion is a bottom part of said vessel, said second volume portion is an upper part of said vessel, wherein said liquid occupies said bottom part, said gaseous waste heat occupies said upper part.

7. The combined power plant according to claim 5, wherein said liquid is water.

8. The combined power plant according to claim 5, wherein said channel (a-1) is in the shape of a tube.

9. The combined power plant according to claim 5, wherein said condenser (c) comprises:
   a hollow sealed vessel (c), wherein one volume portion thereof is configured to be filled with condensed working medium of said direct (Organic Rankine) cycle, and second volume portion thereof is configured to be filled with gaseous phase of said working medium;
   a central inlet channel (c-1) in said vessel configured to be partially submerged in liquid and a swirling gas flow device at its end, wherein a working medium gas is streamed inside of said vessel with rotating movement by said swirling gas flow device;
   inlet (c-5) configured for receiving a liquid working medium of said refrigerating cycle inflows with a pulse feeding system (h) and by work of low pressure created by suction of a jet-flow compressor (f), said working body boils and creates a low temperature, while a working body of said direct cycle (Rankine) in vessel (c) condenses;
   a small sink buffer (c-3) and tube (c-4) configured for letting residual foam sink and return to said condenser;

conical dishes (c-10) configured for assisting return of foam to a process volume downward;

level measurement units (c-9) in pair with a solenoid valve configured to automatically keep required liquid level in said vessel;

a manual valve (c-6) configured for liquid emptying of said vessel and first filling; and a solenoid valve (c-8) and a channel (c-7) configured for forcing said working body liquid to a pressure amplifier (d, k).

10. The combined power plant according to claim 9, wherein said one volume portion is a bottom part and said second volume portion is an upper part of said vessel.

11. The combined power plant according to claim 9, wherein said working medium is a gas.

12. The combined power plant according to claim 11, wherein said gas is R-134a or R-245fa.

13. The combined power plant according to claim 9, wherein said inlet channel (c-1) is in the shape of a tube.

14. The combined power plant according to claim 1, wherein said input waste heat vapor generator (a) is enhanced with an evaporator with a super heater (a').

15. The combined power plant according to claim 1, wherein said inverse (refrigerating) cycle comprises:

an input waste heat evaporator (e);

jet-flow compressor (f);

a pulsing sub-system (h) configured for working medium delivery into a heat exchanger (i) of a main condenser (c);

a non-return valve (n);

a refrigerating condenser (g); and a refrigerating pressure amplifier (k).

16. The combined power plant according to claim 15, wherein said jet-flow compressor (f) comprises:

a separate nozzle (f-1);

a critical diameter of which may be defined by gas dynamics functions;

a receiving nozzle (f-2), performed integrally with a receiving chamber (f-4);

the receiving chamber (f-4); and a diffuser part (f-5), wherein all parts of said jet-flow compressor perform as an integral assembly.

17. The combined power plant according to claim 16, wherein a critical diameter of said separate nozzle (f-1) is defined by said gas dynamic function.

18. The combined power plant according to claim 16, wherein said receiving chamber (f-4) is of cylindrical or conical form with inlet/outlet diameter ratio for the conical form of 1:1.22.

19. The combined power plant according to claim 16, wherein said diffuser part (f-5) comprises an outlet diameter ratio to the receiving chamber (f-4) outlet diameter of 1:2.5.

20. The combined power plant according to claim 16, wherein said diffuser part (f-5) comprises a length of said diffuser part of 10/12 length of said receiving chamber (f-4).

21. The combined power plant according to claim 15, wherein said pulsing sub-system (h) is configured to keep constant temperature and pressure of said working medium in condensed phase independent of system load changes and ambient temperature conditions, wherein said constant temperature and pressure are kept by forcing said working medium into said input waste heat evaporator (e) of reverse refrigerating cycle by pulses.

22. The combined power plant according to claim 21, wherein at load increase pulses frequency is increased and at load decrease pulses frequency is decreased.

23. The combined power plant according to claim 21, wherein a pressure difference between start of pulse and end of pulse is configured to determine force of inflow of said working medium into said input waste heat evaporator (e), preferably initial said pressure difference is 0.01 MPa and final is 0.04 MPa.

24. The combined power plant according to claim 1, wherein said pressure amplifier (FIG. 6) comprises:

vessel (d-1); and automatic threshold valve (d-3), wherein said vessel comprises free space and is periodically connected to high pressure vapor stream from said generator through said automatic threshold valve (d-3), and wherein said pressure amplifier (d) is placed higher relative to said input waste heat generator (a).

25. The combined power plant according to claim 24, wherein periodic connection between said vessel (d-1) and automatic threshold valve (d-3) is done with time relay or pressure relay combined with non-return valves.

26. The combined power plant according to claim 1, wherein said pressure amplifier further comprising a heat exchange surface for increasing speed of filling it with said working medium.

27. The combined power plant according to claim 26, wherein said heat exchange surface is in the form of a helical tube or other form.

28. The combined power plant according to claim 26, wherein said heat exchange surface comprises liquid inlet in communication with a pulsing system (d-7, d-8) and an outlet (d-9) in communication with said jet-flow compressor for sucking working body vapor.

29. The combined power plant according to claim 26, wherein said heat exchange surface is in close vicinity with a pulse system.

30. The combined power plant according to claim 29, wherein a distance between said heat exchange surface and pulse system is 100 to 150 mm, wherein a sucking inlet between said heat exchange surface and jet-flow compressor is without any bends.

31. The combined power plant according to claim 24, wherein said pressure amplifier further comprises pressure sensing actuators configured to regulate the filling and emptying of said pressure amplifier.

32. The combined power plant according to claim 24, wherein said pressure amplifier further comprises time programmed means configured to regulate the filling and emptying of said pressure amplifier.

33. The combined power plant according to claim 14, wherein height of said pressure amplifier relative to said input waste heat generator (a) is configured to achieve pressure edge of 100 to 200 mm of water height.

34. The combined power plant according to claim 4, wherein said working medium is a low boiling temperature working medium with a boiling temperature range of +60° C. to 550° C.

35. The combined power plant according to claim 34, wherein said low boiling temperature working medium is a gas.

36. The combined power plant according to claim 35, wherein said gas is selected from R-134a and R245fa low boiling temperature gases.

37. The combined power plant according to claim 4, further comprising a condenser which is configured to cool said working medium to preliminary programmed temperature between (+)5° C. and (−)35° C.

38. The combined power plant according to claim 1, configured for producing electrical energy of small power in the range of 5 kW to 12 MW, wherein said direct (Organic Rankine) cycle comprises:
- an input waste vapor generator (a);
- an evaporator with super heater (a');
- a turbine (b) combined with electrical generator;
- a condenser (c);
- a pressure amplifier (d);
- a jet-flow compressor (f); and
- a pulsing sub-system (h).

39. The combined power plant according to claim 38, wherein said small power is in the range of 5 kW and 300 kW.

* * * * *